Dec. 21, 1965    W. S. SCHNEIDER ETAL    3,224,640
RECLOSABLE PACKAGE
Filed June 21, 1962    2 Sheets-Sheet 1
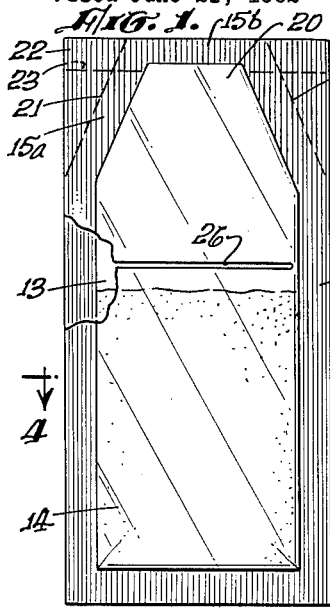
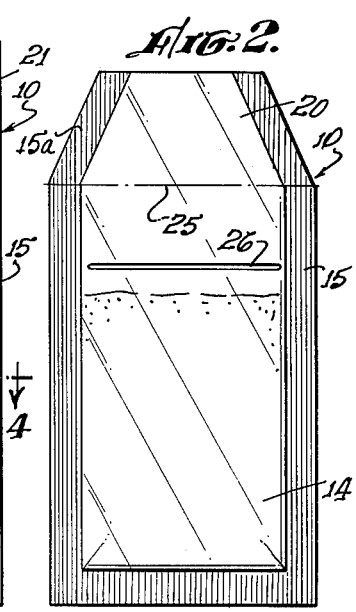
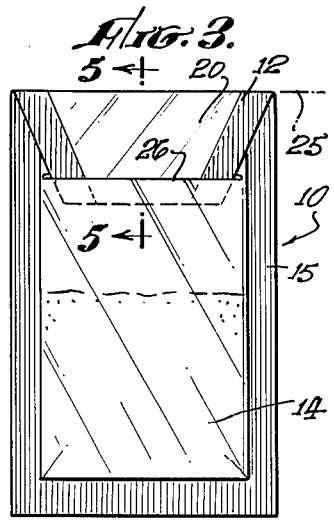
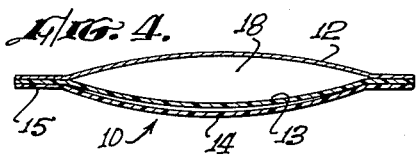
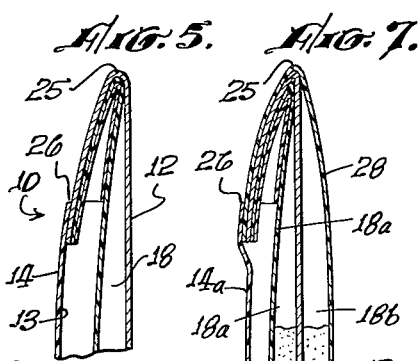
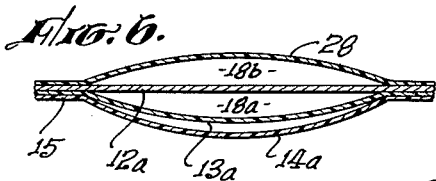
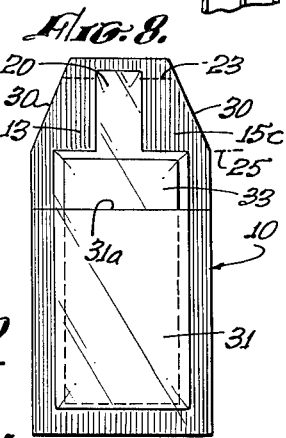
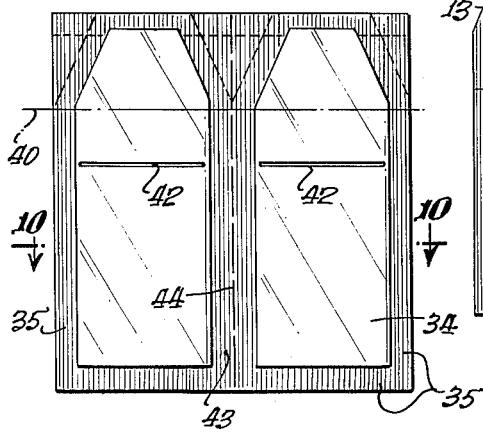
INVENTORS.
WILLIAM S. SCHNEIDER,
ARTHUR P. CORELLA,
BY
Knight & Rodgers
ATTORNEYS

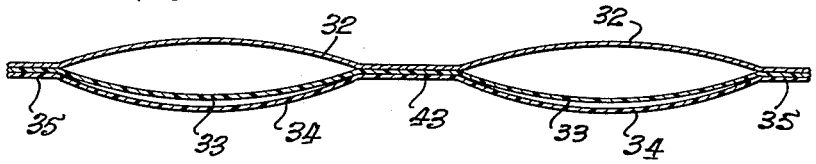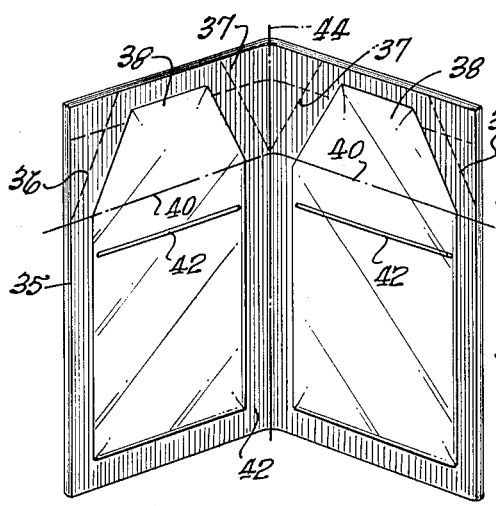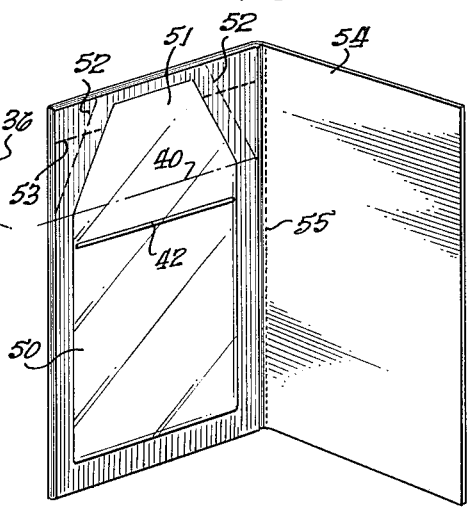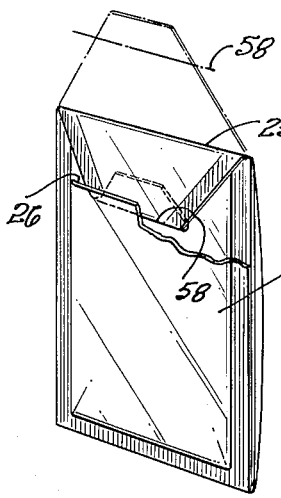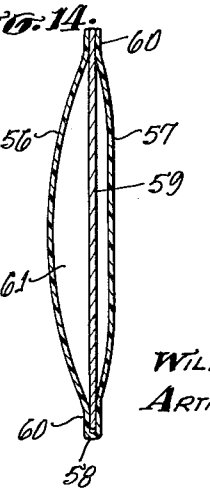
WILLIAM S. SCHNEIDER,
ARTHUR P. CORELLA,
INVENTORS.
BY
ATTORNEYS.

United States Patent Office 3,224,640
Patented Dec. 21, 1965

3,224,640
RECLOSABLE PACKAGE
William S. Schneider, Glendale, and Arthur P. Corella, North Hollywood, Calif., assignors of ten percent to V. Wayne Rodgers, South Pasadena, Calif.
Filed June 21, 1962, Ser. No. 204,170
11 Claims. (Cl. 222—107)

The present invention relates generally to containers and packages made from flexible sheet materials which can be heat sealed together and more especially to packages of this character which are reclosable, permitting at least a portion of the contents to be temporarily stored within the package after it has been initially opened.

Many different types of products have been packaged in containers made of thin, flexible webs of various types of synthetic resins or plastics, it being possible to join two walls of the package together by heat sealing them together. Packages of this kind have been economical to produce on high speed machinery and have found many applications. However, a problem that in the past has confronted the packaging industry has been the inability in many cases to reclose the package, after it has been initially opened. When reclosed, it should be reasonably well sealed against external dirt and moisture or against the loss of its contents, especially if the contents are in liquid form. The object in reclosing the package is to permit the contents to be used over a period of time, thus requiring that at least a portion of the contents be stored temporarily in the original container. Such a container that is reclosable is generally termed a multi-use container as opposed to a unit-of-use container which holds a small quantity of product all of which is normally emptied out of the container at one time.

Packages made from such flexible films have been very popular because they can be produced for but a small fraction of the cost of rigid containers made entirely from cardboard, metal or other relatively stiff or rigid materials. Containers made from flexible films are generally of the flat or envelope type and because of the lack of inherent stiffness or rigidity cannot stand up by themselves, it being necessary to rest them on one side. Because such containers are not reclosable, they present a substantial problem in leakage or loss of liquid contents when lying on the side after the original package has been opened. The combination in one container of reclosability and ability to stand up with the maximum use of flexible films is highly desirable.

Recently merchandisers of expensive products in small quantities have sought to increase the display area of a small bottle or the like by attaching to the bottle a large display card that stands up when the bottle rests on its base. This illustrates another desirable attribute of a container from a commercial viewpoint, the inclusion in the package of provision for display advertising. An incidental benefit is a reduction in loss by pilferage as the article is harder to conceal.

A known design having a similar object is a container having a special base designed to hold a card or leaflet. Here it is desired to provide means for simple attachment to a container of advertising or instructional literature.

Hence, it is a general object of the invention to provide a novel package for different types of materials that uses economical film materials but reduces or eliminates disadvantages of many prior packages made from these same materials; for example a package made from thin sheet stock that can be reclosed after initially being opened.

It is another object of the invention to provide a package of this character which can be made with one or more product containing compartments and which may include sheet stock sufficiently stiff that the package can stand up on one end.

It is another object of the invention to provide a container of this character that can be adapted to hold liquids as well as dry or solid materials.

Another object is to provide a novel package of this character that is adapted to easy manufacture with a large display card or similar area that can be used for advertising or the like and then removed without destroying the integrity of the package, or which can be made with integral pocket means to hold a card or other literature.

A further object of the invention is to provide a novel design of package of the above character that can be produced on known types of form-and-fill packaging machinery with minimum modification thereof; and more particularly a reclosable package that can be made from three or more webs without intricate angled cuts.

Also an object is to provide a package of novel design that is of attractive, symmetrical appearance and uses a minimum amount of packaging material in making the package reclosable.

The above or other objects are achieved according to the present invention in a reclosable package comprising at least two walls of similar size and shape joined together around their periphery by means including heat sealed areas to define an interior product holding space, the heat sealed areas being disposed to form adjoining one edge of the package a discharge channel which has a lesser width, at least in part, than the adjoining product holding space; a quantity of product in said space; and means externally of said two walls to receive and hold a portion of the package at the outer end of said channel when the package is folded over along a line extending transversely of the axis of the channel, and said portion of the package, including the end of the discharge channel, is inserted behind said receiving means, the channel being effectively closed when the package is folded along said line to inhibit entry of the product into said channel.

How the above and other objects of the invention are attained will be more readily understood by reference to the following description and to the annexed drawing, in which:

FIG. 1 is a side elevation of one form of reclosable package embodying the present invention.

FIG. 2 is a side elevation of the package of FIG. 1 with portions removed to open the package.

FIG. 3 is a side elevation thereof illustrating the manner of reclosing the package by folding to close the discharge channel.

FIG. 4 is an enlarged transverse section on line 4—4 of FIG. 1.

FIG. 5 is an enlarged fragmentary vertical section on line 5—5 of FIG. 3.

FIG. 6 is a section similar to FIG. 4 illustrating a modified form of the invention.

FIG. 7 is an enlarged fragmentary section similar to FIG. 5 through the modified form of the invention illustrated in FIG. 6.

FIG. 8 is a side elevation of a package embodying another modified form of the invention.

FIG. 9 is a side elevation of a package embodying a further modified form of the invention.

FIG. 10 is an enlarged transverse section on line 10—10 of FIG. 9.

FIG. 11 is a perspective of the package of FIG. 10 standing up.

FIG. 12 is a view similar to FIG. 11 of a modified form of the invention.

FIG. 13 is a perspective illustrating a variational manner of folding the package to reclose it.

FIG. 14 is a transverse section similar to FIG. 4 of another modified form of the invention.

FIG. 15 is a fragmentary side elevation of the upper end of the reclosed package of FIG. 14.

Referring now to the drawing, and particularly to FIGS. 1 through 5, there is illustrated therein one form of the present invention. This particular form of the invention is described first since it has most of the features of novelty of the invention and it is easy to understand from this basic form various possible variations in the package.

The package indicated generally at 10 has three walls 12, 13 and 14, shown in FIG. 4. The package is rectangular in outline and the three walls are all of the same size and shape.

Wall 12 preferably has sufficient stiffness to cause the package to retain its original shape and, as will be explained later, this degree of stiffness is sufficient in some forms of the invention to enable the package to stand up. While the invention is not limited to any particular material for wall 12, a typical example of a suitable material is a paper board of approximately .005 inch in thickness coated on the outside with a layer of aluminum foil and on the inside with a layer of heat sealing material, for example polyethylene, of .002 inch in thickness. This gives a total thickness of about .007 inch; but it will be appreciated that a greater or lesser degree of stiffness can be imparted to wall 12 by increasing or decreasing the thickness of the paper board. In addition to heat sealing, the polyethylene coating, if continuous, makes the board impervious to liquids.

Central wall 13 is preferably made from a flexible web, for example cellulose acetate film which is coated on both sides with a layer of heat sealing material, for example polyethylene. The other outside wall 14 is likewise a flexible web, such as cellulose acetate film and it is coated on the inside face only with heat sealing material, such as polyethylene. The two walls 13 and 14 may be made of stock having a thickness of about .0015–.002 inch, more or less, excluding the thickness of the layers of heat sealing material.

The three walls of the package are joined together around their periphery by means including heat sealed areas. In the embodiment of the invention illustrated in FIGS. 1–5, the heat sealed area 15 extends around the entire periphery of the completed package. In its broadest aspects, the invention is not thus limited; but this is an advantageous construction permitting the package to be produced by high speed form-and-fill machinery from three webs which are cut simultaneously so that all three walls are the same in size and shape.

Joining walls 12 and 13 together by heat sealed areas 15 produces between these two walls a space 18 which is adapted to hold a product enclosed within the package. One of the advantages of the present package is that a wide variety of products, such as powders, tablets, liquids, or semi-liquid pastes may be packaged. As will be seen from FIG. 1, the product holding space 18 is normally not completely filled with the product. The heat sealed areas 15 at two opposite sides of the package are increased in width, as indicated at 15a, to form a discharge channel 20 which tapers to a lesser width adjoining one edge of the package. This discharge channel 20 is continuous with product holding space 18 and is at least in part of lesser width than the adjoining product holding space. The reasons for this will become apparent.

At each of the two corners having the widened sealed areas 15a, there is a line of weakness 21 extending across the corner diagonally and defining a portion 22 of the sealed area which is removable by tearing the package along the line of weakness. These lines of weakness 21 may be established by any known means, as for example by a row of closely spaced perforations, by scoring the walls, or any other suitable means. When the triangular corner portions 22 are torn off along lines 21, the portion of the package containing discharge channel 20 is then formed into a tapered tongue, as may be seen in FIG. 2. The completed and filled package of FIG. 1 also has another line of weakness 23 formed in a similar manner which extends transversely across the package at a position slightly inwardly of the sealed area 15b closing the end of discharge spout 20. If line 23 is formed by perforations, it is discontinued across the discharge channel because the contents would leak out through such perforations. However, other means, such as scoring may be used, in which case the line of weakness may be continuous across the discharge channel.

In a typical process of forming and filling the package, the heat sealed areas extend all the way around the four sides of the package, as explained above, and channel 20 is closed at 15b in order to hermetically seal the contents of the package. By tearing along line 23, a portion of the package including the peripheral sealed area 15b is removed and the end of channel 20 is opened, allowing the product to be discharged through the open end of discharge channel 20. After the end of the package is opened in this manner and two trinagular corners at 22 are torn off, the opened package appears as in FIG. 2. Line of weakness 23 is shown as extending entirely across package 10, from edge to edge, as this is preferred. But it will be apparent that the line of weakness accomplishes fully its purposes if it extends only between the two corner lines of weakness 21.

If only a portion of the contents are removed from the package and it is desired to reclose the package, in order to permit storage of the remainder of the contents in the package, the package is then folded over along some line as at 25 which extends transversely of the axis of the channel and is located near the base of pouring channel 20 in the vicinity of its junction with product holding space 18. Actually, line 25 may cross either the channel itself or the product space 18 and be equally effective.

Wall 14 at one side of the package is provided with a transversely extending slit 26 into which the end of the tongue containing discharge channel 20 may be tucked, as shown in FIG. 3. Thus wall 14 and slit 26 provide means to receive and hold the folded over portion of the package, the fold in the package along the line 25 being effective to close the pouring channel and to inhibit access thereto of the product in space 18.

Various modified forms of the invention are possible and will be described with reference to the basic package illustrated in FIGS. 1 through 5 since most of these modifications can be easily understood as being derived by adding to or modifying some portion of the basic package. For example, there is shown in FIG. 6 a two compartment package in which the product holding compartments are arranged back-to-back. In this case the walls 12a, 13a and 14a are all arranged and constructed as shown and described previously with respect to walls 12, 13, and 14, respectively, except that wall 12a does not have any foil on it. Wall 12a may be coated on one or both sides with polyethylene to make the board impervious to liquids packaged in compartments 18a and 18b. There has been added to the package another wall 28, similar to wall 13a but on the opposite side of wall 12a which now becomes an inner wall. As a result in addition to the product holding space 18a, comparable to space 18, there is a second product holding space 18b on the opposite side of wall 12a.

The package is constructed as previously described with respect to sealed areas 15 and the lines of weakness 21 and 23, and therefore appears in side elevation as seen in FIG. 1. There is a pouring channel formed at the end of each of the two product holding spaces 18a and 18b at the same end of the package. After the package has been opened and it is desired to reclose it, it is folded over along a line 25 extending transversely of the package so that the single tongue containing the two discharge channels 20 is then inserted in slit 26 behind the lower portion of wall 14a. The upper end of the reclosed package then appears as shown in section in FIG. 7, the single fold at 25 serving to close both the discharge channels or substantially to cut off both the product compartments 18a and 18b from communication with their respective discharge channels. It will be seen without detailed illustration that this back-to-back arrangement of the product receiving compartments is attained by merely adding to the package 10 an additional wall 28, making a total of four walls all originally of the same size and shape which are heat sealed together around the margins of the package at the areas 15. Since both discharge channels extend toward the same edge of the package, they are both opened simultaneously by removing a portion of the peripheral sealed area by tearing the package along the transverse line of weakness 23.

Both forms of the invention so far described have the advantage that they can be made by essentially the same process on known types of either horizontally or vertically operating machines. Their production involves continuously and simultaneously feeding either three or four continuous webs or strips of flexible, heat sealing materials past a heat sealing station, at least two of the strips forming between them a product holding space. In the case of the package of FIG. 6, three such webs form two product holding spaces. As the webs move past the sealing station, heat seals are placed at marginal areas. Heat sealed areas at least along two opposite edges (the long edges in FIG. 1) are required to join together all three or four strips, as the case may be in a manner that one of the strips is free at one edge to receive and hold the tongue.

Heat seals are placed at one or both of the remaining two edges of the package, as required. If a container alone is made to be subsequently filed, then a seal at only the third edge (the bottom edge in FIG. 2) is required the fourth edge being sealed after the product is in place; but if the package is made on form and fill machinery, the product being inserted in the package as it is formed, then seals are placed during manufacture at all four sides of the package to hermetically seal the contents.

With either form of package, lines of weakness are formed in the heat sealed areas at positions to define removable corner portions of the container that when removed form a tongue containing the pouring channel and of a width less than the full width of the adjoining container. It is also preferable to provide an additional line of weakness which defines a removable portion of the container including a part of the peripheral seal so that when the container is torn along this last mentioned line of weakness, the pouring channel is opened to permit discharge of the contents. As a final step in the operation, the filled package or the container, as the case may be, is severed from the following strips.

In order to provide the means for retaining the folded over tongue, the third wall of the three-wall package is preferably provided with a slit at a suitable stage in the package forming operation. It is preferred to slit the strip stock as the package is being formed as this insures proper positioning of the slit on the package, instead of using pre-slit stock. However, this latter type of stock may be used, eliminating the slitting operation from the manufacture of the package itself.

There is shown in FIG. 8 a further modified form of the invention having several changes over the package illustrated in FIGS. 1–3 which will be mentioned, but otherwise constructed in a similar manner. For example, instead of providing lines of weakness 21, the same two successive corners at one end of the package may be die cut along lines 30 to remove the corners of the sealed areas 15c producing a package as illustrated in FIG. 8. This package is not strictly rectangular in outline but is generally so and has two walls of the same size and shape.

Also the shape of the widened sealed areas at 15c has been changed somewhat compared with the areas 15a.

This change results in a discharge channel 20 which has parallel sides rather than converging sides, as previously.

However, the most significant change is in the means for receiving and holding the folded over portion of the package. Instead of a full wall 14 of the size and shape of the other walls, as shown in FIG. 1, only a partial wall 31 is provided. This part wall extends from the bottom or end of the package up to the position of slit 26, covering about half or somewhat more of the package, and is heat sealed around three margins to the remainder of the package by the same seals 15 which seal together walls 12 and 13. However, one end 31a of the wall is free to receive the portion of the package including the end of the discharge channel, when folded along fold line 25 and inserted behind wall 31 to hold that portion of the package in folded position.

Since wall 31 is attached at three sides, it forms a pocket open at edge 31a that is adapted to receive a card or leaflet 33 inserted in the pocket. This may be used to carry advertising, instructions, or other text material to accompany the package. The pocket thus has a dual advantage. The same advantage is obtained with the embodiment in FIGS. 1–3 since the printed matter may be folded and inserted in slit 26.

Another embodiment of the invention is illustrated in FIGS. 9 and 10 which comprises a multiple compartment package that may be described generally as consisting of two packages each similar to that of FIG. 1 arranged side-by-side. Two such packages are, in effect, joined together along most or all of their common side. Together, they form a generally rectangular package having two separate product holding compartments arranged side-by-side and disposed on the same side of the wall 32 which is made of stock having a moderate degree of stiffness, as previously described in connection with wall 12. The other two walls 33 and 34 of the package are of very flexible cellulose acetate film which is limp and by itself does not impart any given size or shape to the package. The walls are joined together by marginal heat areas 35 and a central area 42 separating the compartments holding a product. The two compartments shown in FIG. 9 are formed by the three walls 32, 33 and 34 in the same manner as the package illustrated in FIG. 1. In addition to the lines of weakness 36 at corners of the package, there are two other similar lines of weakness 37 at the central portion of the package disposed in a V-shape. Removal of the triangular corner portions along lines 36 and the central triangular portion along the two lines 37 produces a tongue portion for each of the compartments having in it a discharge channel 38. Now each of these discharge channel containing portions may be folded over independently of the other along the fold line 40, permitting the two compartments of the package to be opened and closed individually and independently of each other.

The tongue portions of the package when folded over are received behind and held by the wall 34 which has in it two slits 42, each of which is designed to receive and hold one of the tongues associated with one of the compartments.

Considering the package as a whole, the walls are sealed together by means including marginal heat sealed areas 35 and heat sealed area 42 located centrally of the package. This central area 42 provides a portion of the package at which it is naturally foldable along the longitudinally extending fold line 44. The two halves of the package may be folded together face-to-face for carrying, or they may be only partially folded into a flat V-shape as illustrated in FIG. 11. In this configuration of the package, the angular disposition of the two portions of the package forms a V-shaped base which, together with the rigidity imparted to it by the stiffness of wall 32, enables the package to stand upright when resting on one end. This characteristic of the package is advantageous from a commercial viewpoint since it permits a series of the packages to be nested one against another and to stand upright upon a shelf, achieving what is commercially known as "high density stacking." This is a feature of packages desired by retailers in order to economize on shelf space. Furthermore, the package is maintained in such a position that it is advantageously displayed.

Another embodiment of the invention is illustrated in FIG. 12 which may be regarded as derived from the two compartment package of FIG. 11 by simply omitting one product compartment, the one at the right hand when the package is viewed as in FIG. 11. This package comprises a single product holding compartment at 50 with a discharge channel 51 at the upper end and the lines of weakness at 52 and 53 as and for reasons already described. The wall 54 which is made of paper board and gives stiffness to the package is extended out beyond the heat sealed areas defining the product holding space 50, for either or both of two reasons. In the first place, the extension permits a fold to be placed in the package to enable it to stand up, as just described. Also, the extension of wall 54 may carry printing for advertising or instructional purposes. The width of wall 54 is sufficient to give stability to the package when standing upright (FIG. 12) and this also forms a conveniently located area adjacent the package upon which to place advertising, instructions or other text. A line of perforations 55 may be added to make easy removal of part of the wall extension, if desired.

The package of FIG. 12 may also be viewed as a modification of the package of FIG. 1 in which at least the wall 12 is extended beyond the heat sealed area 15 defining the compartment 18 to permit folding the extension (54 in FIG. 12) along a longitudinal line. Such folding establishes a V-shaped base on which the package can stand upright to prevent spilling of the contents even though the discharge channel is open and not tucked in.

Thus both the forms in FIGS. 11 and 12 provide the advantages of a hermetically sealed, reclosable package that can stand up on a V-shaped base to avoid spilling and may carry a detachable area for display printing. Both are cheaper and lighter than glass, avoid the danger of breakage, and have a convenient flat shape for carrying in a pocket.

FIG. 13 illustrates a variational form of folding the tongue portion of the package containing the discharge channel. Here the tongue is folded twice, first along line 58 parallel to fold line 25 but closer to the discharge opening in order to provide two folds across the discharge channel. The portion of the package tucked in behind wall 14 is thus a double thickness. The purpose of the extra fold is an improved closure of the channel to give added security against leakage of liquids or fine powders from the package should it be lying down so that the contents naturally flow to the end of the package at the fold lines.

FIG. 14 is a modification of the invention in which the three walls are formed by only two separate webs. The two outer walls 56 and 57 are integral along one edge 58, being formed by folding longitudinally a single web which is initially twice the width of the finished package. This web is typically cellulose acetate that is heat sealing on one side. The third wall 59 is a strip of board between the folded walls 56 and 57. The board preferably has a moderate degree of stiffness as described above, and may be heat sealing on both sides, especially if it is desired to make it impervious to liquids. Since the heat sealing layer on the inner face of walls 56 and 57 can be made to adhere to the plain board, wall 59 may alternatively be without a heat sealing layer on either or both sides.

The outer walls 56 and 57 are heat sealed to opposite faces of wall 59 at marginal areas 60 extending around the edges of the package. The package produced thus appears in side elevation the same as the package in FIG. 1, having a pouring channel as at 20 and lines of weakness as at 21 and 23. The product holding compartment is between center wall 59 and one of the outer walls, as at 61 between walls 56 and 59. The tongue holding slit 26 is then cut in the other outer wall 57. When the package is reclosed, the upper end appears as in FIG. 15, with the tongue folded over and tucked into the slit 26.

A particular advantage of this construction is that registration of one wall 56 or 57 with the package automatically achieves registered of the other wall, thus permitting both walls to carry accurately positioned printing, either text or display material. Separate or individual registration of two separate webs is highly complex and impractical.

Like the embodiments previously described, this package is preferably formed by simultaneously feeding in one wall 59 of material heat sealing on two sides between a pair of walls 56 and 57 that are heat sealing on one side only, and sealing the walls together at marginal areas to define the interior product holding space into which a quantity of a product is placed. As the heat sealed areas are placed, they form a discharge channel; and the lines of weakness are preferably placed at this same time to facilitate opening the package and forming a tongue that can be folded over and tucked in the tongue receiving means. This last means is preferably a slit in one outer wall cut prior to placing the final heat seals. The difference in making this last described package lies in the fact that two walls are formed from a single web which is folded longitudinally prior to feeding it past the sealing station.

It will be evident that the same advantages can be achieved in the package of FIG. 6 by making the two walls 28 and 13a integral along one edge, should it be desired to place printed material of any character on both walls.

It will be appreciated from the above description that various changes in design and detail may be made in packages without departing from the spirit and scope of the invention. Accordingly, it is to be understood the foregoing is considered to be illustrative of, rather than limitative upon, the invention as defined by the appended claims.

We claim:

1. A flexible reclosable package comprising:
   two walls of similar size and shape joined together by means including heat sealed areas to define an interior product holding space,
   the heat sealed areas being disposed to form adjoining one edge of the package a discharge channel, the package being of lesser width adjoining said one edge than across the adjoining product holding space;
   a quantity of product in said space;
   and pocket forming means externally of said two walls and attached to the package at two opposite margins thereof but free of the walls between said margins, said pocket means being open to receive and hold a portion of the package at the outer end of said channel when the package is folded over along a line extending transversely of the channel and said lesser width portion of the package including the end of the channel is inserted in said pocket forming means, said channel being closed when the package is folded along said line to inhibit the product from entering said channel.

2. A flexible package as in claim 1 that also includes means including a portion of the peripheral sealed area removable to form an exit opening for said product at the outer end of the channel and at one edge of the package.

3. A flexible package comprising:
   at least three walls of similar size and shape joined together around their periphery by means including heat sealed areas to define an interior product holding space between two of said walls;

said heat sealed areas being disposed to form a discharge channel leading to one edge of the package; and a quantity of a product in said space;

the third wall having a slit in it at a position to receive and hold a portion of the package at the outer end of the discharge channel when the package is folded over along a line between the slit and the outer end of the channel and extending across the package transversely of the channel, said channel being closed when the package is folded along said line to inhibit the product from entering said channel, said package being rectangular in outline and having means at each of two successive corners to define a line of weakness across the corner in the sealed area and along which the corners can be removed to reduce the width of the package at the outer end of the channel to a width less than the width of the slit in the third wall.

4. A flexible package as in claim 3 in which the central wall of the three walls is sealable to each of the other two walls and the other two walls are each coated with a layer of heat sealing material on the side facing the central wall and the three walls are heat sealed together.

5. The method of making a reclosable package holding a quantity of a fluent material that includes the steps of:
simultaneously feeding past a sealing station a first strip of material heat sealable on two sides between two strips of material heat sealable on one side facing the first mentioned strip;
joining the three strips together by heat sealed areas to define a product holding space between the first strip and one of said two strips by placing heat seals in selected areas of the strips;
said heat sealed areas continuously sealing one of the outer strips to an adjoining strip around marginal areas to form a pocket closed at three sides and open at the fourth side;
inserting product in the product holding space;
forming a discharge channel adjoining the product holding space and defined by the heat sealed areas;
reducing the width of the package adjacent the outer end of the discharge channel;
and folding over the package across the discharge channel and inserting the reduced width portion and the outer end of the discharge channel into the pocket.

6. The method of making a reclosable package as in claim 5 in which formation of the means to receive and hold the folded over portion takes place at the side of the first strip opposite to the product holding space.

7. A flexible package comprising:
at least three walls of similar size and shape joined together around their periphery by means including heat sealed areas to define an interior product holding space between two of said walls;
said heat sealed areas being disposed to form in a portion of the package a discharge channel leading to one edge of the package, said portion of the package progressively decreasing in width toward said one edge;
and a quantity of a product in said space;
the third wall having a slit in it at a position to receive and hold the reduced width portion of the package at the outer end of the discharge channel when the package is folded over along a line between the slit and the outer end of the channel and extending across the package transversely of the channel, said channel being closed when the package is folded along said line to inhibit the product from entering said channel.

8. A flexible reclosable package comprising:
two walls of similar size and shape joined together by means including heat sealed areas to define an interior product holding space,
the heat sealed areas being disposed to form adjoining one edge of the package a discharge channel of lesser width at least in part than the adjoining product holding space;
a quantity of product in said space;
and pocket forming means externally of said two walls to receive and hold a portion of the package at the outer end of said channel when the package is folded over along a line extending transversely of the channel and said portion of the package including the end of the channel is inserted in said pocket forming means, said channel being closed when the package is folded along said line to inhibit the product from entering said channel,
said package being rectangular in outline and having means at each of two successive corners to define a line of weakness across said corner in the sealed area and along which said corner can be removed to reduce the width of the package at the outer end of the channel to a width less than the width of the pocket means.

9. The method of making a container for fluent materials that includes the steps of
continuously and simultaneously feeding at least three continuous strips of substantially equal width of flexible, heat sealing materials past a sealing station, at least two of the strips forming between them a product holding space;
placing heat seals at marginal areas along two opposite longitudinal edges of the container to join together the three strips;
placing transversely extending heat seals at spaced positions joining together at least two of the strips to define a product holding space and a pouring channel;
removing portions of the container to form a tongue containing said pouring channel, said tongue being of less width at least in part than the adjoining container;
cutting a slit in one of the outer strips to receive said tongue when folded over along a line extending transversely of the package and hold said tongue in the folded position to close the discharge channel;
and severing the container from the following strips.

10. The method of making a container for fluent materials that includes the steps of
continuously and simultaneously feeding longitudinally at least three continuous strips of flexible, heat sealing materials past a sealing station with one longitudinal edge of all strips in mutual alignment, at least two of the strips being of equal width and forming between them a product holding space, and a third strip outside the other two strips being of lesser width than said other two strips;
placing heat seals at marginal areas along two opposite longitudinal edges of the container to join together all three strips at one margin and said two strips at the other margin thereof;
placing transversely extending heat seals at spaced positions joining together all three of the strips to define a product holding space and a pouring channel between said two strips of equal width and an external pocket between the third strip and one of said two strips;
removing portions of the container to form a tongue containing said pouring channel, said tongue being of less width at least in part than the adjoining container;
said pocket being positioned to receive one end of the pouring channel when said tongue is folded over along a line extending transversely of the package and hold said tongue in the folded position to close the discharge channel;
and severing the container from the following strips.

11. A flexible package comprising:
at least three walls of similar size and shape joined together around their periphery by means including heat sealed areas to define an interior product holding space between two of said walls;

the central wall of the three walls being heat sealable on both sides and heat sealed at said areas to each of the other two walls and the other two walls being heat sealable only on the inner side facing the central wall;

said heat sealed areas being disposed to form a discharge channel leading to one edge of the package; and a quantity of a product in said space;

the third wall having a slit in it at a position to receive and hold a portion of the package at the outer end of the discharge channel when the package is folded over along a line between the slit and the outer end of the channel and extending across the package transversely of the channel, said channel being closed when the package is folded along said line to inhibit the product from entering said channel, said package being of generally rectangular outline but having at one end a narrowed portion containing the discharge channel and being of less width than the adjoining portion of the package, said narrowed portion passing at least in part through said slit to place the outer end of the discharge channel entirely behind the third wall.

References Cited by the Examiner

UNITED STATES PATENTS

| | | | |
|---|---|---|---|
| 432,308 | 7/1890 | Guilbert | 229—62 |
| 2,047,745 | 7/1936 | Poppe | 229—56 |
| 2,133,909 | 10/1938 | Thomas | 206—29 |
| 2,257,823 | 10/1941 | Stokes | 229—55 |
| 2,333,587 | 11/1943 | Salfisberg | 229—55 |
| 2,465,172 | 3/1949 | Salfisberg | 229—72 |
| 2,572,056 | 10/1951 | Salfisberg | 206—46 |
| 2,718,105 | 9/1955 | Ferguson et al. | 53—28 |
| 2,793,743 | 5/1957 | Lefebvre | 229—62 |
| 2,813,286 | 11/1957 | Strader | 206—56 |
| 2,942,760 | 6/1960 | Schneider | 222—107 |
| 2,999,627 | 9/1961 | Reinhardt. | |
| 3,003,681 | 10/1961 | Orsini | 229—57 |
| 3,026,016 | 3/1962 | Scher | 229—55 |

FOREIGN PATENTS

| | | |
|---|---|---|
| 1,016,042 | 4/1952 | France. |
| 827,084 | 2/1960 | Great Britain. |
| 589,515 | 3/1959 | Italy. |

THERON E. CONDON, *Primary Examiner.*